United States Patent
Venugopal et al.

(10) Patent No.: US 11,671,163 B2
(45) Date of Patent: Jun. 6, 2023

(54) BEAM FAILURE DETECTION WHEN CONTROL RESOURCE SET BEAM IS UPDATED

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/107,431

(22) Filed: Nov. 30, 2020

(65) Prior Publication Data
US 2022/0173785 A1    Jun. 2, 2022

(51) Int. Cl.
H04B 7/08 (2006.01)
H04L 5/00 (2006.01)
(Continued)

(52) U.S. Cl.
CPC ........... H04B 7/088 (2013.01); H04B 7/0695 (2013.01); H04L 5/0094 (2013.01);
(Continued)

(58) Field of Classification Search
CPC ..... H04B 7/088; H04B 7/0695; H04L 5/0094; H04L 5/0096; H04L 47/746; H04W 24/10;
(Continued)

(56) References Cited

U.S. PATENT DOCUMENTS

2019/0297648 A1* 9/2019 Nagaraja ............... H04B 7/0632
2020/0145983 A1* 5/2020 Levitsky ............... H04L 5/0053
(Continued)

OTHER PUBLICATIONS

3GPP TS 38.213: "3rd Generation Partnership Project; Technical Specification Group Radio Access Network; NR; Physical Layer Procedures for Control (Release 16)," 3GPP Standard; Technical Specification; 3GPP TS 38.213, 3RD Generation Partnership Project (3GPP), Mobile Competence Centre, 650, Route Des Lucioles, F-06921, Sophia-Antipolis Cedex, France, vol. Ran WG1, No. V16.3.0, Oct. 2, 2020 (Oct. 2, 2020), pp. 1-179, XP051961308, Retrieved from the Internet: URL: http://ftp.3gpp.org/Specs/archive/38_series/38.213/38213-g30.zip 38213-g30.docx [retrieved on Oct. 2, 2020] clause 7.2.1; p. 24-p. 26 clauses 9 & 9.1; p. 49-p. 76 clause 9.2; p. 77, paragraph 1—paragraph 4, p. 81, paragraph 14—p. 82. Paragraph 1, p. 47, paragraph 3, p. 76. paragraph 7—paragraph 10, Section 11. 2A.
(Continued)

*Primary Examiner* — Joshua Kading
(74) *Attorney, Agent, or Firm* — Harrity & Harrity, LLP

(57) ABSTRACT

Various aspects of the present disclosure generally relate to wireless communication. In some aspects, a user equipment (UE) may receive a beam update message identifying a change from a first control resource set (CORESET) beam to a second CORESET beam. The UE may use, for a beam failure detection (BFD) procedure, a first BFD reference signal associated with the first CORESET beam or a second BFD reference signal associated with the second CORESET beam based at least in part on one or more selection criteria. Numerous other aspects are provided.

30 Claims, 8 Drawing Sheets

(51) Int. Cl.
| | |
|---|---|
| *H04L 47/74* | (2022.01) |
| *H04W 72/04* | (2009.01) |
| *H04B 7/06* | (2006.01) |
| *H04W 24/10* | (2009.01) |
| *H04W 72/044* | (2023.01) |
| *H04W 72/23* | (2023.01) |
| *H04W 72/53* | (2023.01) |

(52) U.S. Cl.
CPC .......... *H04L 5/0096* (2013.01); *H04L 47/746* (2013.01); *H04W 24/10* (2013.01); *H04W 72/046* (2013.01); *H04W 72/23* (2023.01); *H04W 72/53* (2023.01)

(58) Field of Classification Search
CPC ............. H04W 72/042; H04W 72/046; H04W 72/0493
See application file for complete search history.

(56) References Cited

U.S. PATENT DOCUMENTS

| | | | | |
|---|---|---|---|---|
| 2020/0154450 | A1* | 5/2020 | Zhou | H04W 48/16 |
| 2020/0229169 | A1* | 7/2020 | John Wilson | H04W 72/044 |
| 2020/0314676 | A1* | 10/2020 | Lin | H04L 5/0053 |
| 2021/0014022 | A1* | 1/2021 | Yang | H04L 5/005 |
| 2021/0226684 | A1* | 7/2021 | Koskela | H04W 76/18 |
| 2021/0242922 | A1* | 8/2021 | Koskela | H04W 72/042 |
| 2022/0086658 | A1* | 3/2022 | Zhang | H04B 17/345 |
| 2022/0116859 | A1* | 4/2022 | Park | H04L 5/005 |

OTHER PUBLICATIONS

"3rd Generation Partnership Project, Technical Specification Group Radio Access Network, NR, Requirements for Support of Radio Resource Management (Release 16)", 3GPP Draft, 3GPP TS 38.133 V16.4.0 (Jun. 2020), 38133-G40, 3rd Generation Partnership Project (3GPP), Mobile Competence Centre, 650, Route Des Lucioles, F-06921 Sophia-Antipolis Cedex, France, Jul. 17, 2020 (Jul. 17, 2020), XP051909353, 1351 Pages, Retrieved from the Internet: URL: https://ftp.3gpp.org/3guInternal/3GPP_ultimate_versions_to_be_transposed/sentToDpc/38133-g40.zip. [Retrieved on Jul. 17, 2020] Sections 8.10.2, 8.10.3, p. 31.
International Search Report and Written Opinion—PCT/US2021/072611—ISA/EPO—dated Feb. 30, 2022.

* cited by examiner

BEAM FAILURE DETECTION WHEN CONTROL RESOURCE SET BEAM IS UPDATED

FIELD OF THE DISCLOSURE

Aspects of the present disclosure generally relate to wireless communication and to techniques and apparatuses for beam failure detection when a control resource set (CORESET) beam is updated.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a beam update message identifying a change from a first control resource set (CORESET) beam to a second CORESET beam; and using, for a beam failure detection (BFD) procedure, a first BFD reference signal associated with the first CORESET beam or a second BFD reference signal associated with the second CORESET beam based at least in part on one or more selection criteria.

In some aspects, a UE for wireless communication includes a memory and one or more processors operatively coupled to the memory, the memory and the one or more processors configured to: receive a beam update message identifying a change from a first CORESET beam to a second CORESET beam; and use, for a BFD procedure, a first BFD reference signal associated with the first CORESET beam or a second BFD reference signal associated with the second CORESET beam based at least in part on one or more selection criteria.

In some aspects, a non-transitory computer-readable medium storing a set of instructions for wireless communication includes one or more instructions that, when executed by one or more processors of a UE, cause the UE to: receive a beam update message identifying a change from a first CORESET beam to a second CORESET beam; and use, for a BFD procedure, a first BFD reference signal associated with the first CORESET beam or a second BFD reference signal associated with the second CORESET beam based at least in part on one or more selection criteria.

In some aspects, an apparatus for wireless communication includes means for receiving a beam update message identifying a change from a first CORESET beam to a second CORESET beam; and means for using, for a BFD procedure, a first BFD reference signal associated with the first CORESET beam or a second BFD reference signal associated with the second CORESET beam based at least in part on one or more selection criteria.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
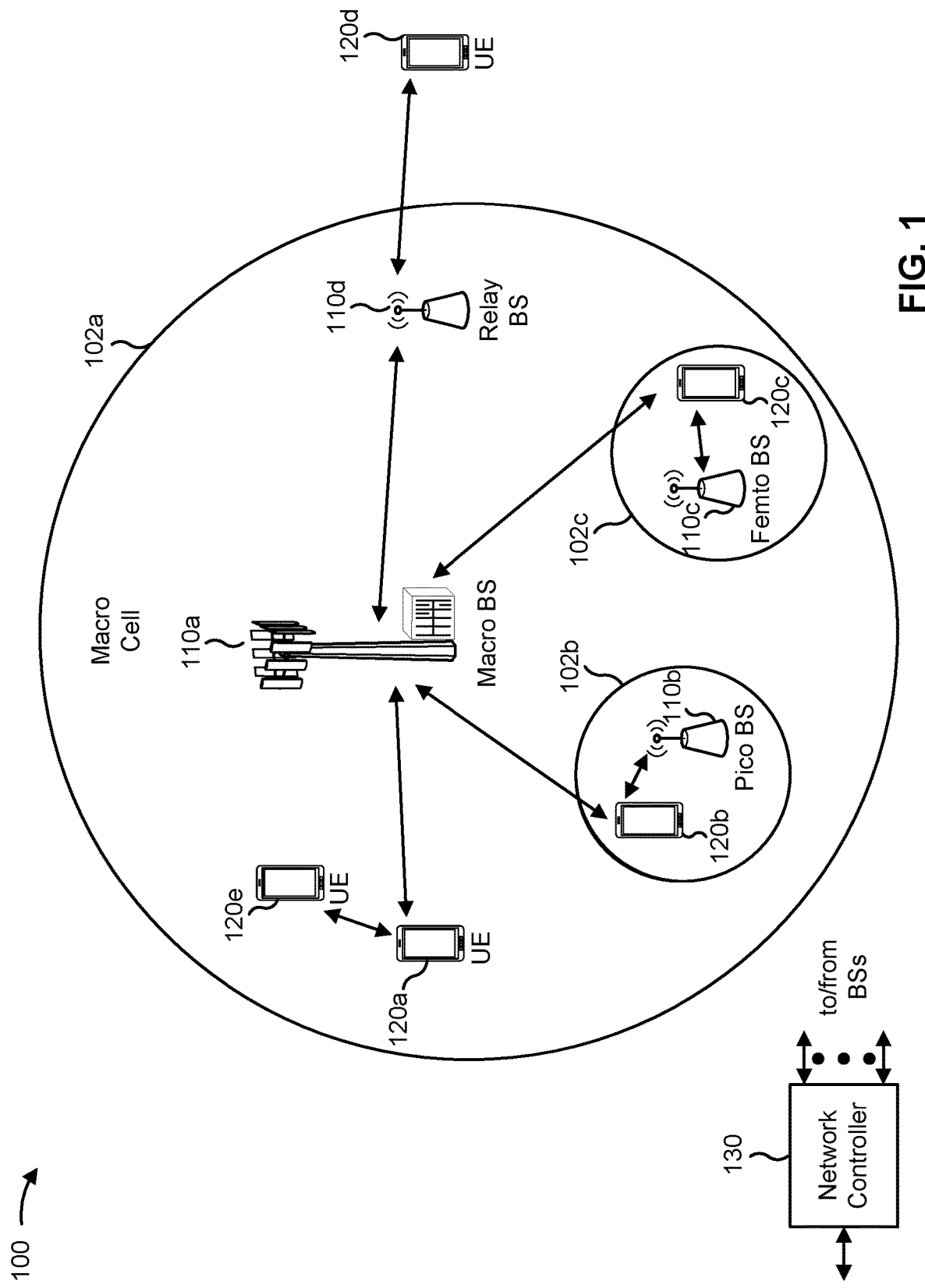
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
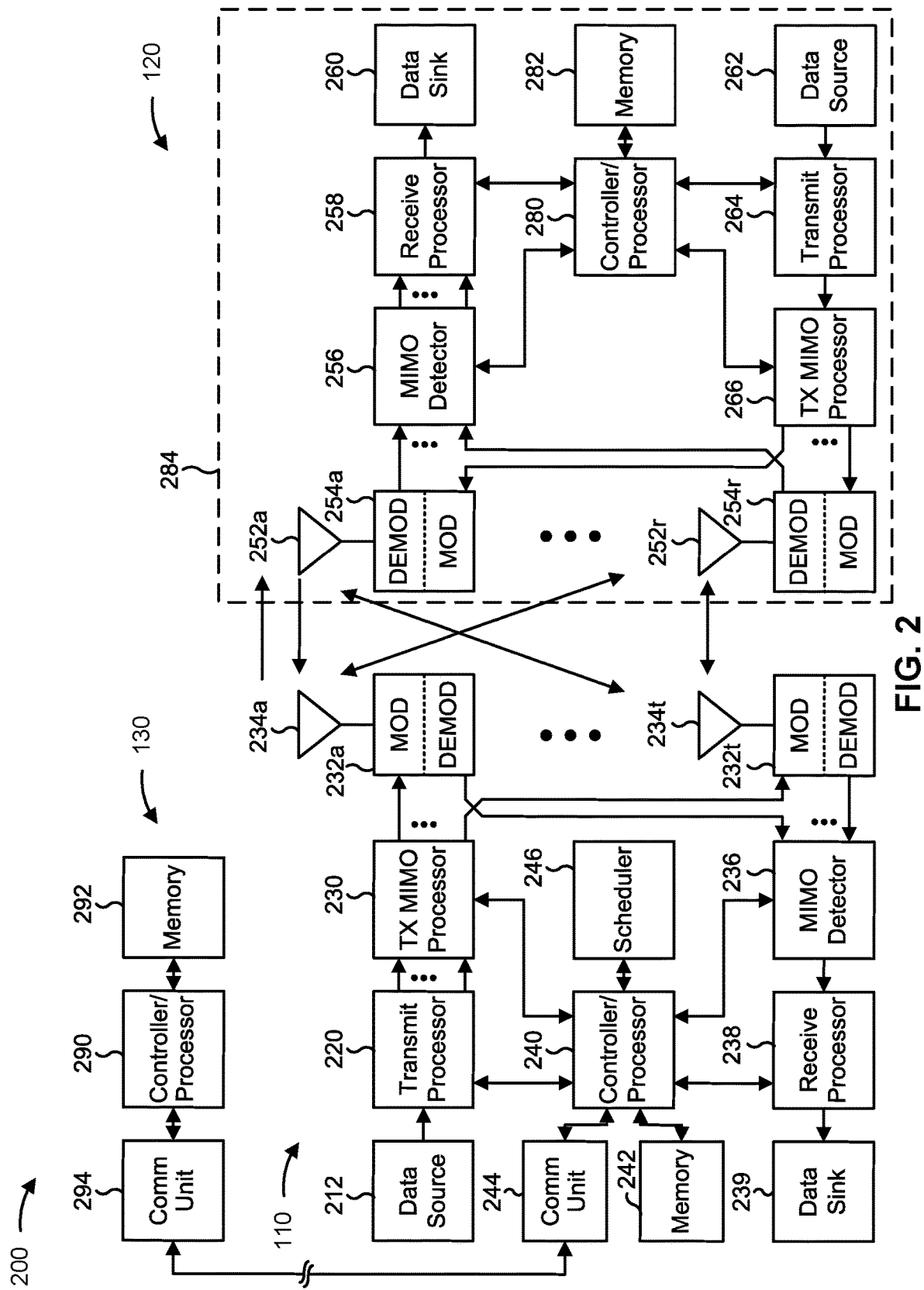
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-7.

Controller/processor 240 of base station 110, controller/processor 280 of UE 120, and/or any other component(s) of FIG. 2 may perform one or more techniques associated with beam failure detection (BFD) when a control resource set (CORESET) beam is updated, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, the UE includes means for receiving a beam update message identifying a change from a first CORESET beam to a second CORESET beam; or means for using, for a BFD procedure, a first BFD reference signal associated with the first CORESET beam or a second BFD reference signal associated with the second CORESET beam based at least in part on one or more selection criteria. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for using the first BFD reference signal or the second BFD reference signal based at least in part on whether a BFD reference signal measurement window is elapsed.

In some aspects, the UE includes means for receiving signaling identifying the BFD reference signal measurement window.

In some aspects, the UE includes means for using the first BFD reference signal or the second BFD reference signal based at least in part on whether a sample for the second BFD reference signal is received.

In some aspects, the UE includes means for using the first BFD reference signal or the second BFD reference signal based at least in part on whether a physical downlink control channel beam switching interval is elapsed.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
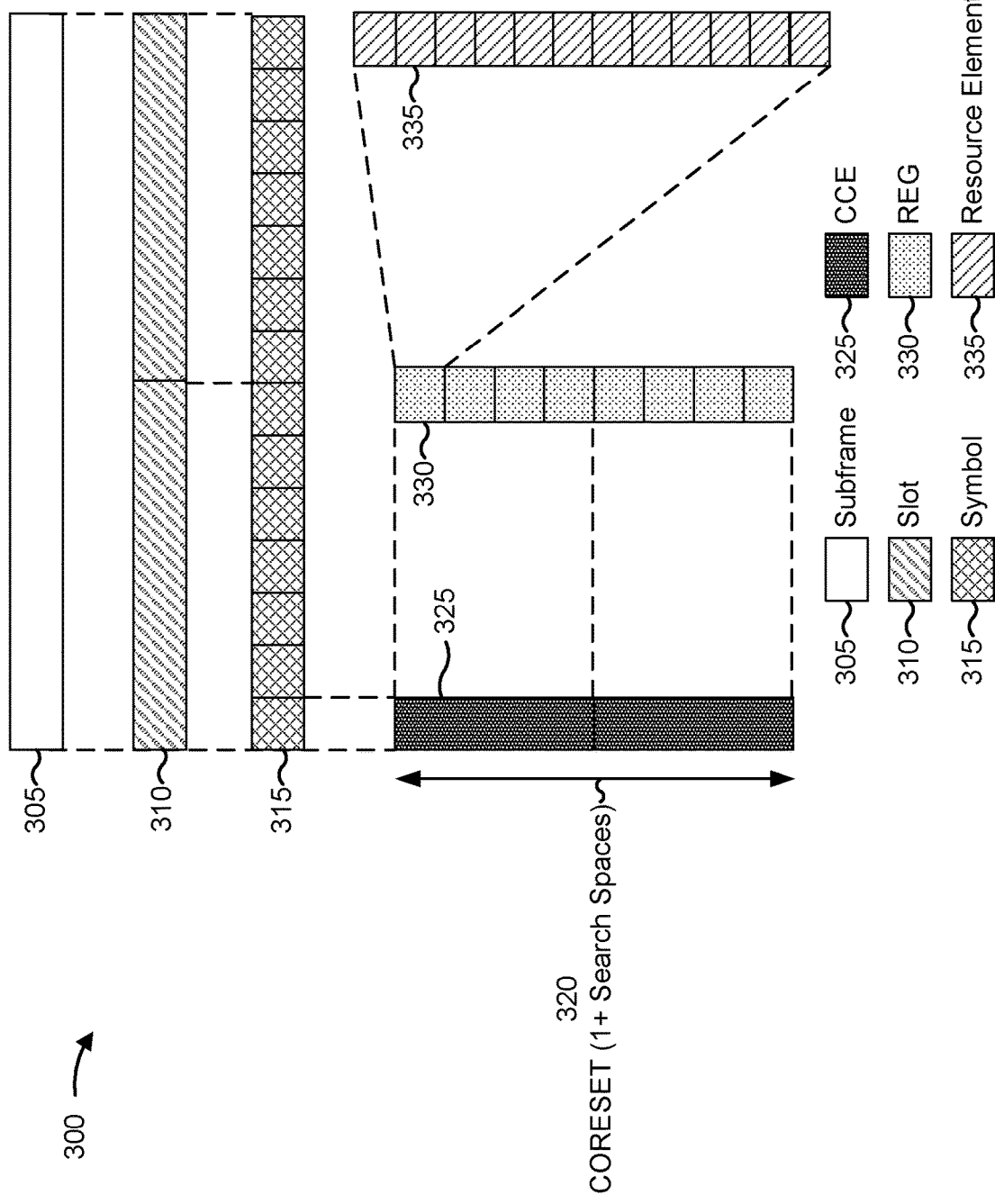
FIG. 3 is a diagram illustrating an example of a resource structure, in accordance with various aspects of the present disclosure.

FIG. 3 is a diagram illustrating an example resource structure 300 for wireless communication, in accordance with various aspects of the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 310 may include multiple symbols 315, such as 14 symbols per slot.

The potential control region of a slot 310 may be referred to as a CORESET 320 and may be structured to support an efficient use of resources, such as by flexible configuration or reconfiguration of resources of the CORESET 320 for one or more physical downlink control channels (PDCCHs), one or more physical downlink shared channels (PDSCHs), and/or the like. In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, and/or the like.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

Figure 4:
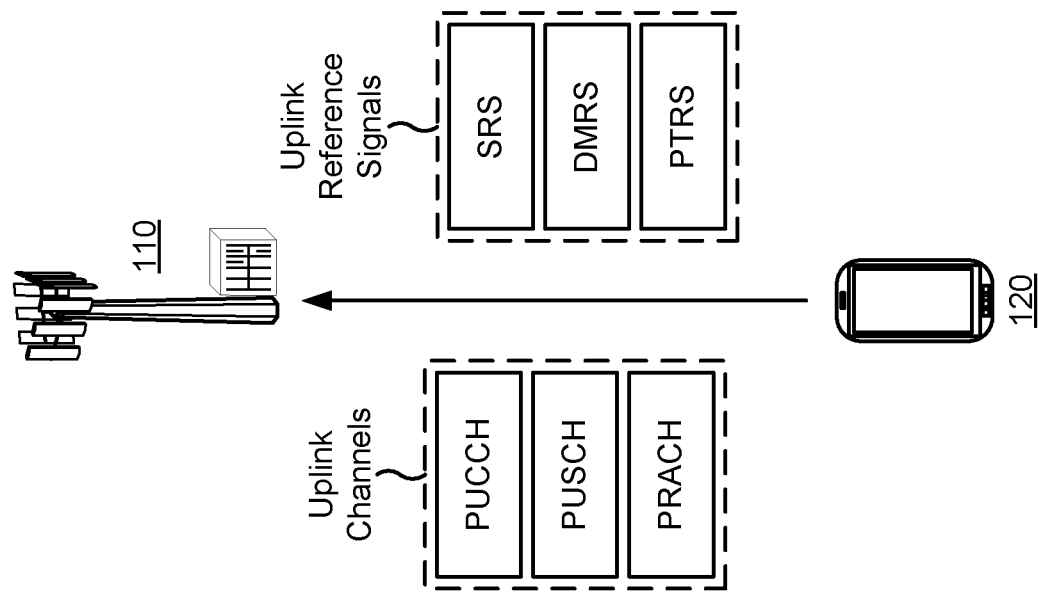
FIG. 4 is a diagram illustrating an example of physical channels and reference signals in a wireless network, in accordance with various aspects of the present disclosure.
Figure 4:
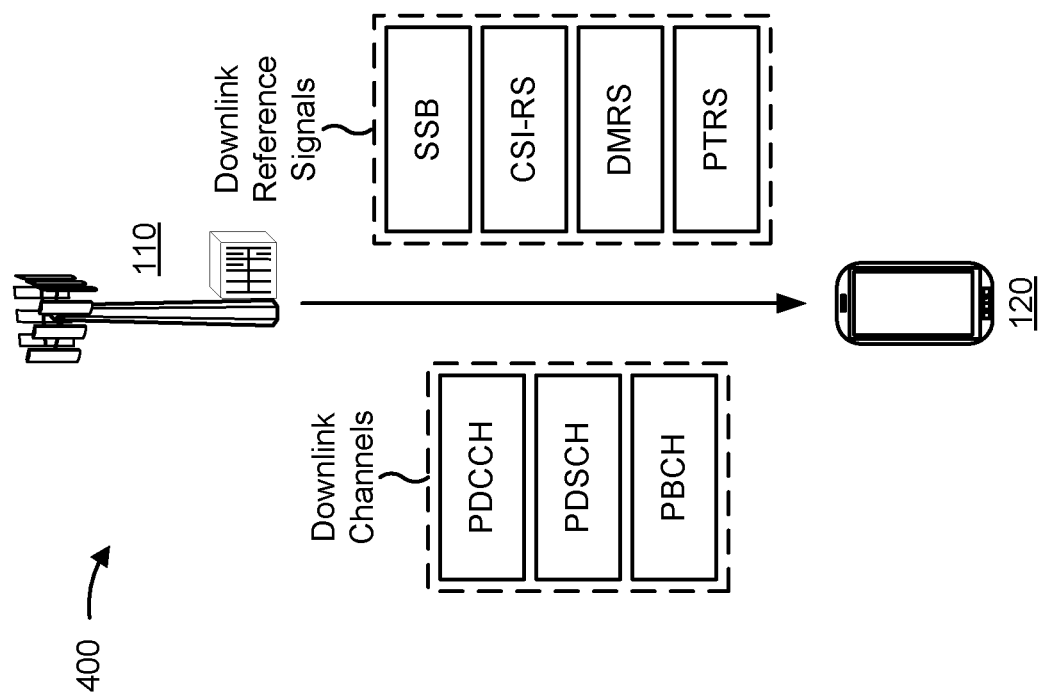

FIG. 4 is a diagram illustrating an example 400 of physical channels and reference signals in a wireless network, in accordance with various aspects of the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a PDCCH that carries DCI, a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
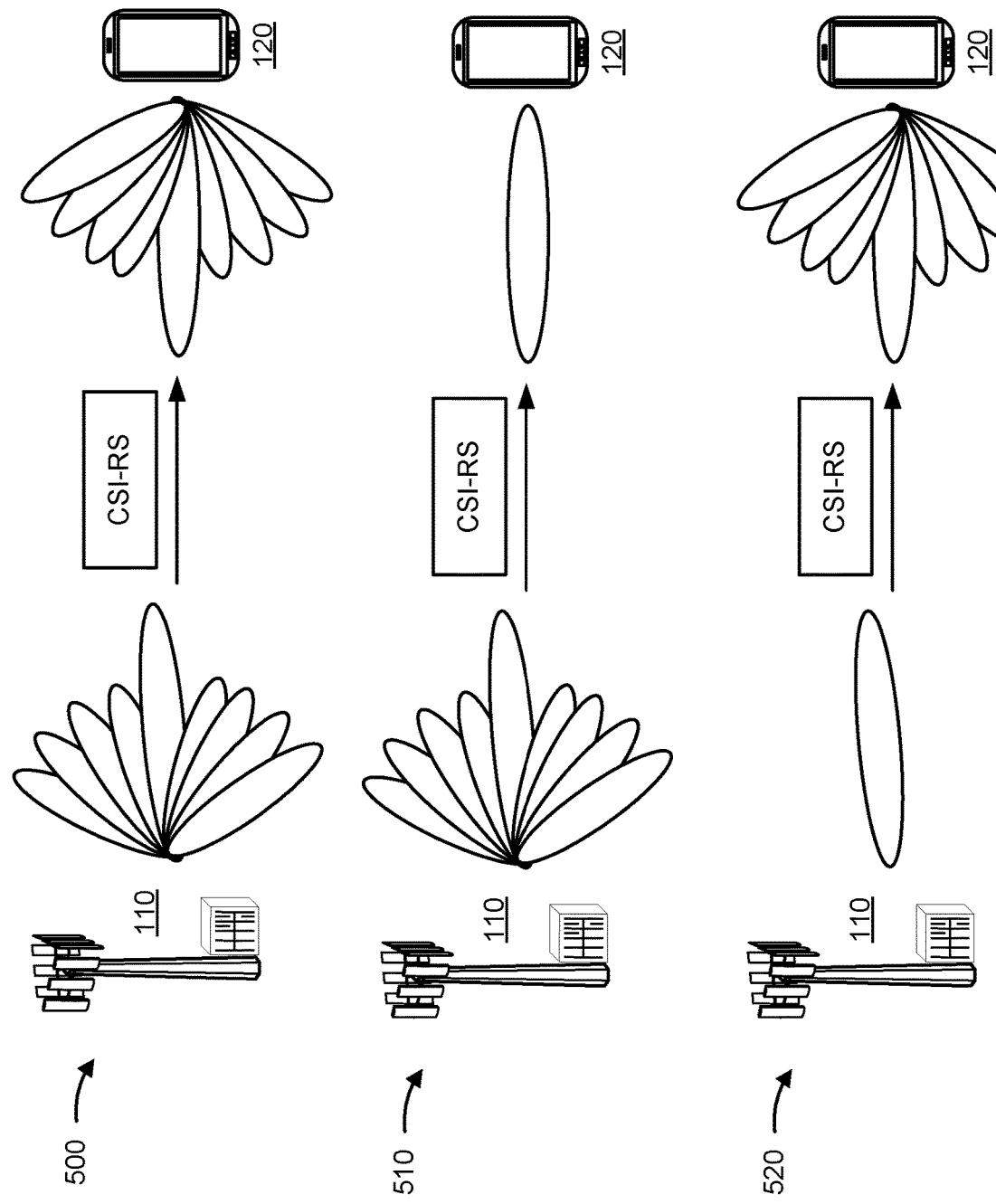
FIG. 5 is a diagram illustrating an example of channel state information reference signal (CSI-RS) beam management procedures, in accordance with various aspects of the present disclosure.

FIG. 5 is a diagram illustrating examples 500, 510, and 520 of CSI-RS beam management procedures, in accordance with various aspects of the present disclosure. As shown in FIG. 5, examples 500, 510, and 520 include a UE 120 in communication with a base station 110 in a wireless network (e.g., wireless network 100). However, the devices shown in FIG. 5 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., an RRC connected state and/or the like).

As shown in FIG. 5, example 500 may include a base station 110 and a UE 120 communicating to perform beam management using CSI-RSs. Example 500 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 5 and example 500, CSI-RSs may be configured to be transmitted from the base station 110 to the UE 120. The CSI-RSs may be configured to be periodic (e.g., using RRC signaling and/or the like), semi-persistent (e.g., using media access control (MAC) control element (MAC-CE) signaling and/or the like), and/or aperiodic (e.g., using DCI and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 500 has been described in connection with CSI-RSs, the first beam management process may also use SSBs for beam management in a similar manner as described above.

As shown in FIG. 5, example 510 may include a base station 110 and a UE 120 communicating to perform beam management using CSI-RSs. Example 510 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 5 and example 510, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 5, example 520 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 5 and example 520, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 5 is provided as an example of beam management procedures. Other examples of beam management procedures may differ from what is described with respect to FIG. 5. For example, the UE 120 and the base station 110 may perform the third beam management procedure before performing the second beam management procedure, the UE 120 and the base station 110 may perform a similar beam management procedure to select a UE transmit beam, and/or the like.

In some communications systems, a UE may receive information identifying a set, $\bar{q}_0$, of periodic CSI-RS resource configuration indices for radio link quality measurement. In cases where the UE does not receive the information identifying the set of periodic CSI-RS resource configuration indices, the UE may determine the set of periodic CSI-RS resource configuration indices based at least in part on a CORESET beam. For example, 3GPP Technical Specification (TS) 38.213 §6 provides for the UE to determine $\bar{q}_0$ based at least in part on reference signal sets indicated by a transmission configuration indicator (TCI) state for CORESETs that the UE uses for monitoring a PDCCH. Based at least in part on determining the set of CSI-RS resource configuration indices, the UE may assess the radio link quality against a radio link quality threshold, $Q_{out, LR}$. As a result of assessing the radio link quality against the radio link quality threshold, the UE may identify a beam failure and initiate a beam failure recovery procedure.

The UE may receive information identifying an update to the TCI state via a medium access control (MAC) control element (CE). For example, the UE may receive a TCI state indication, as described in 3GPP TS 38.312 §6.1.3.15, that identifies a TCI state for PDCCH reception for a CORESET of a set of serving cells. However, after receiving the update to the TCI state, which may correspond to a switch from using a first CORESET beam to using a second CORESET beam, a beam failure may occur without the UE being configured with resources to use to detect the beam failure. As a result, a delay in identifying the beam failure and initiating the beam failure recover procedure may occur resulting in poor network performance.

Some aspects described herein enable beam failure detection in connection with CORESET beam updates. For example, the UE may initiate a beam failure detection (BFD) reference signal measurement window based at least in part on receiving information updating a CORESET beam from a first CORESET beam to a second CORESET beam. In this case, when a new BFD reference signal sample, associated with the second CORESET beam, does not arrive during the BFD reference signal measurement window, the UE may use a BFD reference signal associated with the first CORESET beam to attempt to detect a beam failure. Alternatively, the BS may define a PDCCH beam switching interval that includes at least one new BFD reference signal associated with the second CORESET during the CORESET beam update. In this case, the UE may monitor during a BFD reference signal occasion for a BFD reference signal associated with the second CORESET beam, thereby obviating a need to use a BFD reference signal associated with the first CORESET beam. In this way, the UE is enabled to detect a beam failure after a CORESET beam update, thereby reducing a delay associated with identifying a beam failure.

Figure 6:
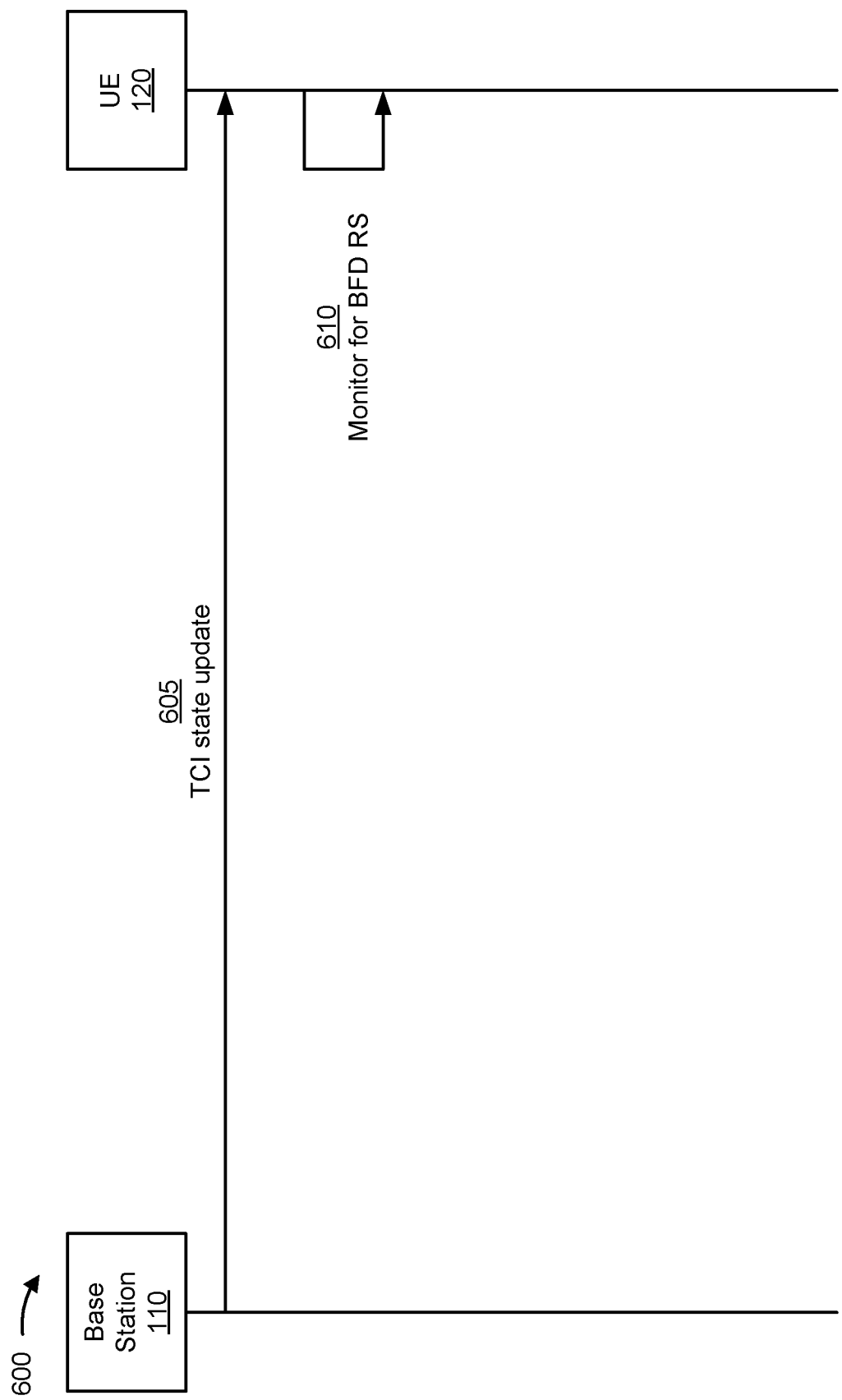
FIG. 6 is a diagram illustrating an example associated with beam failure detection (BFD) when a control resource set (CORESET) beam is updated, in accordance with various aspects of the present disclosure.

FIG. 6 is a diagram illustrating an example 600 associated with beam failure detection when a CORESET beam is updated, in accordance with various aspects of the present disclosure. As shown in FIG. 6, a base station 110 and a UE 120 may communicate with one another.

As further shown in FIG. 6, and by reference number 605, UE 120 may receive a TCI state update. For example, as described above, UE 120 may receive information indicating a switch from a first CORESET beam to a second CORESET beam. In some aspects, UE 120 may receive a MAC CE conveying the TCI state update. For example, UE 120 may receive a MAC CE identifying a TCI state for PDCCH reception of a CORESET of one or more serving cells.

As further shown in FIG. 6, and by reference number 610, UE 120 may monitor for a BFD reference signal (RS). For example, UE 120 may monitor for the BFD reference signal, which may be selected based at least in part on one or more selection criteria, during a BFD reference signal measurement window. In this case, as an example of a selection criterion, if UE 120 does not receive a periodic BFD reference signal sample (e.g., a BFD reference signal associated with the second CORESET beam) during the BFD reference signal measurement window, UE 120 may use a previous reference signal (e.g., a BFD reference signal associated with the first CORESET beam) to perform a beam failure detection procedure. In some aspects, the BFD reference signal measurement window may be a time duration defined from receipt of the TCI state update message to a threshold end time, such as a threshold quantity of slots (e.g., which may be based at least in part on a numerology of a bandwidth part that UE 120 is using for monitoring or which may be based at least in part on a reference subcarrier spacing) or a threshold time interval, among other examples.

In some aspects, the beam failure detection window may be statically defined. For example, UE 120 may determine the beam failure detection window based at least in part on stored information, such as information defined in a standard or other specification. Alternatively, the beam failure detection window may be dynamic. For example, UE 120 may receive signaling identifying the beam failure detection window, such as radio resource control (RRC) signaling explicitly identifying the beam failure detection window. Additionally, or alternatively, UE 120 may receive implicit signaling identifying the beam failure detection window. For example, UE 120 may derive a size of the beam failure detection window based at least in part on a TCI state identifier included in the TCI state update message.

In some aspects, BS 110 may define a minimum PDCCH beam switching interval. For example, BS 110 and UE 120 may be configured such that at least one BFD reference signal occasion associated with the second CORESET beam occurs during the physical downlink control channel beam switching interval. In this case, based on a selection criterion indicating that UE 120 is to use the configured BFD reference signal occasion, UE 120 monitors for the second CORESET beam in the configured BFD reference signal occasion to enable UE 120 to use the second CORESET beam for a beam failure detection procedure.

As indicated above, FIG. 6 is provided as an example. Other examples may differ from what is described with respect to FIG. 6.

Figure 7:
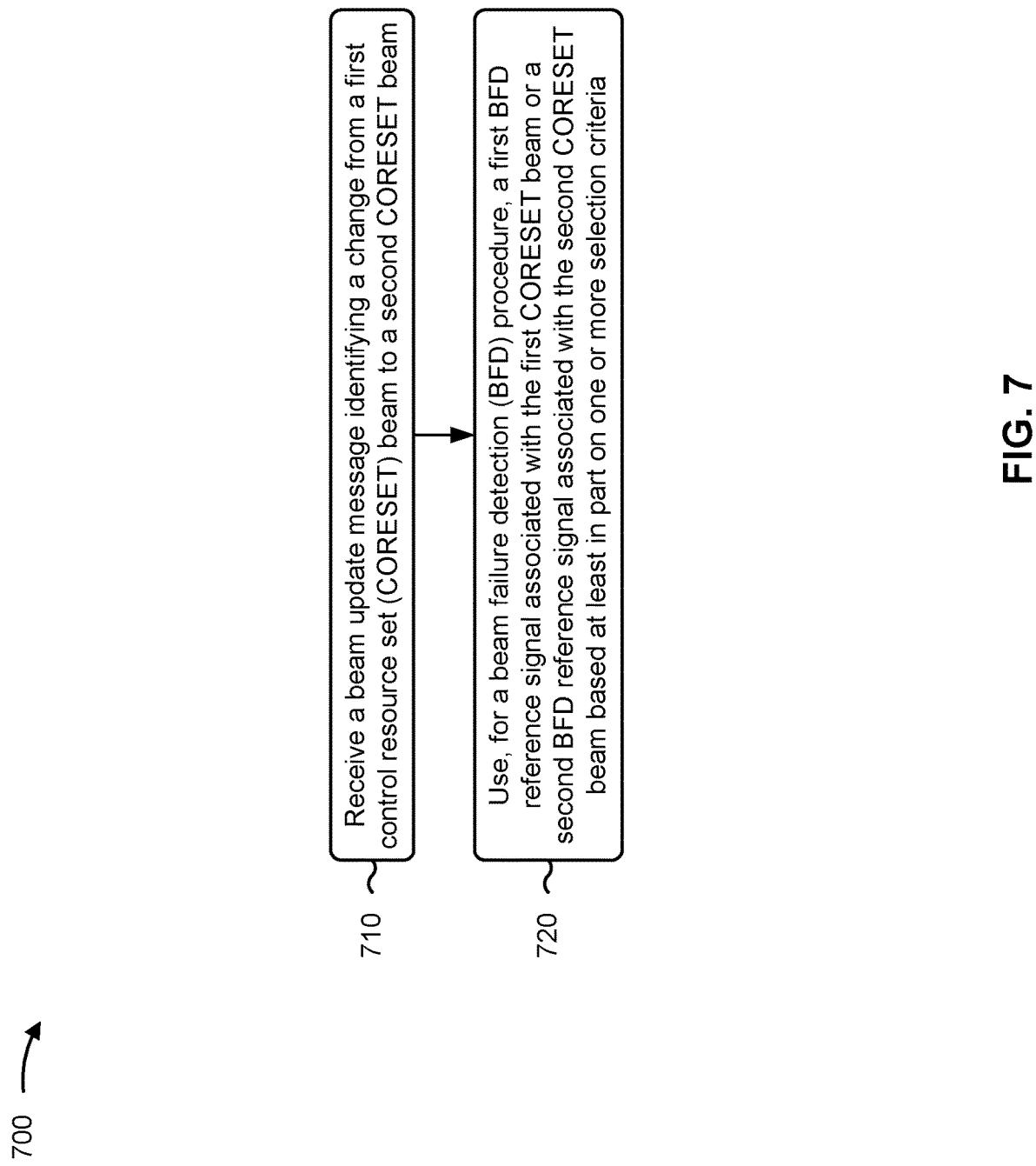
FIG. 7 is a diagram illustrating an example process associated with BFD when a CORESET beam is updated, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120) performs operations associated with beam failure detection when a CORESET beam is updated.

As shown in FIG. 7, in some aspects, process 700 may include receiving a beam update message identifying a change from a first CORESET beam to a second CORESET beam (block 710). For example, the UE (e.g., using reception component 802, depicted in FIG. 8) may receive a beam update message identifying a change from a first CORESET beam to a second CORESET beam, as described above.

As further shown in FIG. 7, in some aspects, process 700 may include using, for a BFD procedure, a first BFD reference signal associated with the first CORESET beam or a second BFD reference signal associated with the second CORESET beam based at least in part on one or more selection criteria (block 720). For example, the UE (e.g., using beam failure detection component 808, depicted in FIG. 8) may use, for a BFD procedure, a first BFD reference signal associated with the first CORESET beam or a second BFD reference signal associated with the second CORESET beam based at least in part on one or more selection criteria, as described above.

Process 700 may include additional aspects, such as any single aspect or any combination of aspects described below and/or in connection with one or more other processes described elsewhere herein.

In a first aspect, using the first BFD reference signal or the second BFD reference signal comprises using the first BFD reference signal or the second BFD reference signal based at least in part on whether a BFD reference signal measurement window is elapsed.

In a second aspect, alone or in combination with the first aspect, the BFD reference signal measurement window is based at least in part on a receipt of the beam update message.

In a third aspect, alone or in combination with one or more of the first and second aspects, the BFD reference signal measurement window is based at least in part on a particular quantity of slots.

In a fourth aspect, alone or in combination with one or more of the first through third aspects, the particular quantity of slots is based at least in part on at least one of a numerology of a bandwidth part or a reference subcarrier spacing.

In a fifth aspect, alone or in combination with one or more of the first through fourth aspects, the BFD reference signal measurement window is statically defined.

In a sixth aspect, alone or in combination with one or more of the first through fifth aspects, process 700 includes receiving signaling identifying the BFD reference signal measurement window.

In a seventh aspect, alone or in combination with one or more of the first through sixth aspects, the signaling includes an explicit identifier of the BFD reference signal measurement window, or a transmission configuration indicator state identifier, for the second BFD reference signal, which corresponds to a size of the BFD reference signal measurement window.

In an eighth aspect, alone or in combination with one or more of the first through seventh aspects, using the first BFD reference signal or the second BFD reference signal comprises using the first BFD reference signal or the second BFD reference signal based at least in part on whether a sample for the second BFD reference signal is received.

In a ninth aspect, alone or in combination with one or more of the first through eighth aspects, using the first BFD reference signal or the second BFD reference signal comprises using the first BFD reference signal or the second BFD reference signal based at least in part on whether a physical downlink control channel beam switching interval is elapsed.

In a tenth aspect, alone or in combination with one or more of the first through ninth aspects, the physical downlink control channel beam switching interval is configured such that at least one BFD reference signal occasion associated with the second CORESET beam occurs during the physical downlink control channel beam switching interval.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
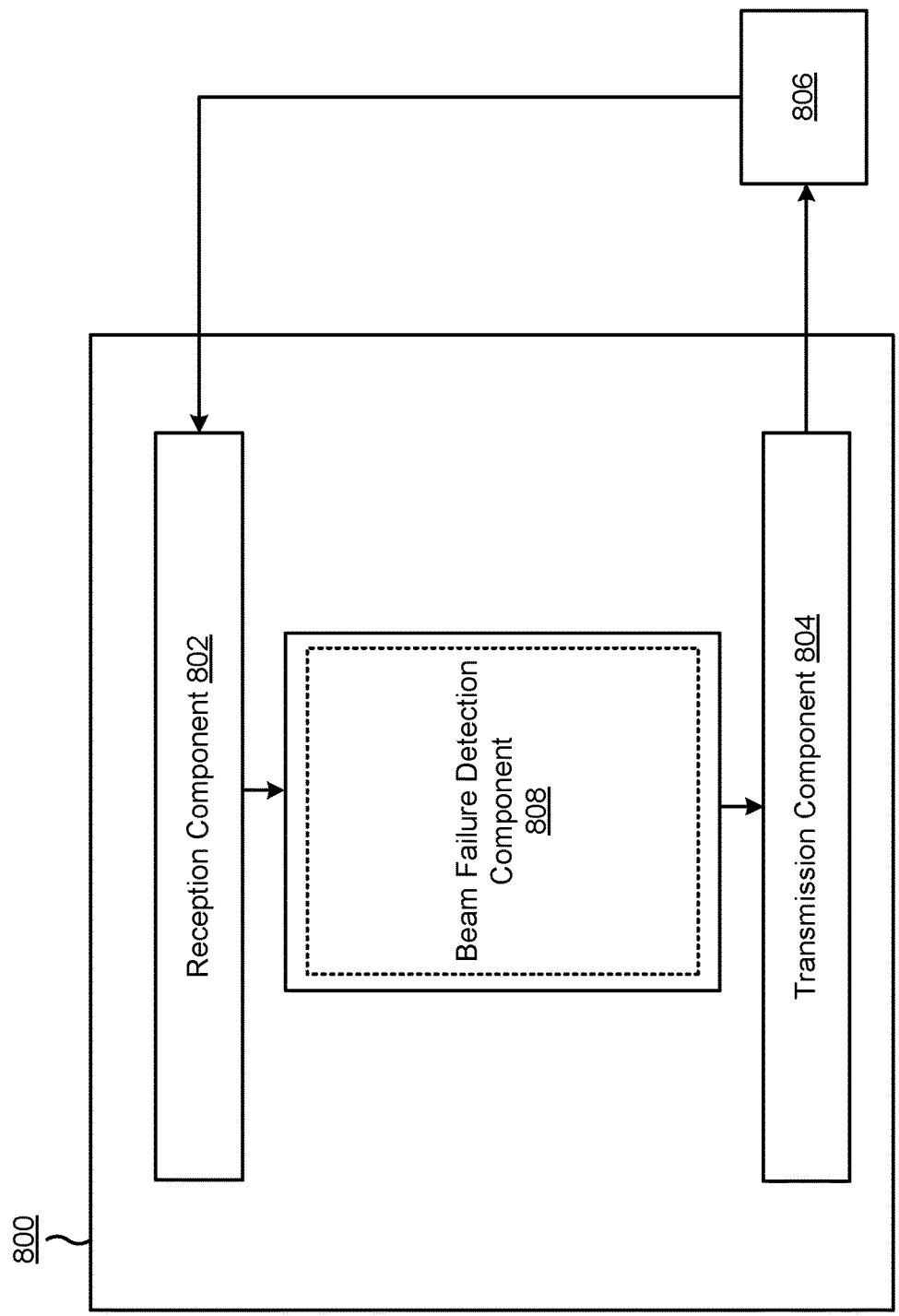
FIG. 8 is a block diagram of an example apparatus for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a beam failure detection component 808, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7, among other examples. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive a beam update message identifying a change from a first CORESET beam to a second CORESET beam. The beam failure detection component 808 may use a first BFD reference signal associated with the first CORESET beam or a second BFD reference signal associated with the second CORESET beam to perform a beam failure detection procedure. For example, the beam failure detection component 808 may cause the reception component 802 to monitor a particular reference signal. The reception component 802 may receive signaling identifying the BFD reference signal measurement window.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Aspect 1: A method of wireless communication performed by a user equipment (UE), comprising: receiving a beam update message identifying a change from a first control resource set (CORESET) beam to a second CORESET beam; and using, for a beam failure detection (BFD) procedure, a first BFD reference signal associated with the first CORESET beam or a second BFD reference signal associated with the second CORESET beam based at least in part on one or more selection criteria.

Aspect 2: The method of aspect 1, wherein using the first BFD reference signal or the second BFD reference signal comprises: using the first BFD reference signal or the second BFD reference signal based at least in part on whether a BFD reference signal measurement window is elapsed.

Aspect 3: The method of aspect 2, wherein the BFD reference signal measurement window is based at least in part on a receipt of the beam update message.

Aspect 4: The method of any of aspects 2 to 3, wherein the BFD reference signal measurement window is based at least in part on a particular quantity of slots.

Aspect 5: The method of aspect 4, wherein the particular quantity of slots is based at least in part on at least one of a numerology of a bandwidth part or a reference subcarrier spacing.

Aspect 6: The method of any of aspects 2 to 5, wherein the BFD reference signal measurement window is statically defined.

Aspect 7: The method of any of aspects 2 to 6, further comprising: receiving signaling identifying the BFD reference signal measurement window.

Aspect 8: The method of aspect 7, wherein the signaling includes an explicit identifier of the BFD reference signal measurement window, or a transmission configuration indicator state identifier, for the second BFD reference signal, which corresponds to a size of the BFD reference signal measurement window.

Aspect 9: The method of any of aspect 1, wherein using the first BFD reference signal or the second BFD reference signal comprises: using the first BFD reference signal or the second BFD reference signal based at least in part on whether a sample for the second BFD reference signal is received.

Aspect 10: The method of any of aspects 1 or 9, wherein using the first BFD reference signal or the second BFD reference signal comprises: using the first BFD reference signal or the second BFD reference signal based at least in part on whether a physical downlink control channel beam switching interval is elapsed.

Aspect 11: The method of aspect 10, wherein the physical downlink control channel beam switching interval is configured such that at least one BFD reference signal occasion associated with the second CORESET beam occurs during the physical downlink control channel beam switching interval.

Aspect 12: An apparatus for wireless communication at a device, comprising a processor; memory coupled with the processor; and instructions stored in the memory and executable by the processor to cause the apparatus to perform a method of any of aspects 1 to 11.

Aspect 13: A UE for wireless communication, comprising a memory and one or more processors coupled to the memory, the memory and the one or more processors configured to perform a method of any of aspects 1 to 11.

Aspect 14: An apparatus for wireless communication, comprising at least one means for performing a method of any of aspects 1 to 11.

Aspect 15: A non-transitory computer-readable medium storing code for wireless communication, the code comprising instructions executable by a processor to perform a method of any of aspects 1 to 11.

Aspect 16: A non-transitory computer-readable medium storing one or more instructions for wireless communication, the one or more instructions comprising one or more instructions that, when executed by one or more processors of a UE, cause the one or more processors to perform a method of any of aspects 1 to 11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method of wireless communication performed by a user equipment (UE), comprising:
receiving a beam update message identifying a change from a first control resource set (CORESET) beam to a second CORESET beam;

monitoring for a first beam failure detection (BFD) reference signal associated with the second CORESET beam; and using, for a BFD procedure and based at least in part on the first BFD reference signal not being received during a BFD reference signal measurement window, a second BFD reference signal associated with the first CORESET beam.

2. The method of claim 1, wherein using the second BFD reference signal comprises:

using the second BFD reference signal based at least in part on an expiration of a time period corresponding to the BFD reference signal measurement window.

3. The method of claim 1, wherein the BFD reference signal measurement window is defined from a receipt of the beam update message to a threshold end time.

4. The method of claim 1, wherein the BFD reference signal measurement window is based at least in part on a particular quantity of slots.

5. The method of claim 4, wherein the particular quantity of slots is based at least in part on at least one of a numerology of a bandwidth part or a reference subcarrier spacing.

6. The method of claim 1, wherein the BFD reference signal measurement window is statically defined.

7. The method of claim 1, further comprising:
receiving signaling identifying the BFD reference signal measurement window.

8. The method of claim 7, wherein the signaling includes an explicit identifier of the BFD reference signal measurement window, or a transmission configuration indicator state identifier, for the second BFD reference signal, which corresponds to a size of the BFD reference signal measurement window.

9. The method of claim 1, further comprising:
using the first BFD reference signal based at least in part on receiving a sample for the second BFD reference signal.

10. The method of claim 1, wherein the BFD reference signal measurement window corresponds to a physical downlink control channel beam switching interval, and wherein using the second BFD reference signal comprises:
using the second BFD reference signal based at least in part on whether the physical downlink control channel beam switching interval is elapsed.

11. The method of claim 10, wherein the physical downlink control channel beam switching interval is configured such that at least one BFD reference signal occasion associated with the second CORESET beam occurs during the physical downlink control channel beam switching interval.

12. A user equipment (UE) for wireless communication, comprising:
a memory; and
one or more processors coupled to the memory, the one or more processors configured to:
receive a beam update message identifying a change from a first control resource set (CORESET) beam to a second CORESET beam;
monitor for a first beam failure detection (BFD) reference signal associated with the second CORESET beam; and
use, for a BFD procedure and based at least in part on the first BFD reference signal not being received within a BFD reference signal measurement window, a second BFD reference signal associated with the first CORESET beam.

13. The UE of claim 12, wherein the one or more processors, when using the second BFD reference signal, are configured to:
use the second BFD reference signal based at least in part on an expiration of a time period corresponding to the BFD reference signal measurement window.

14. The UE of claim 12, wherein the BFD reference signal measurement window is defined from a receipt of the beam update message to a threshold end time.

15. The UE of claim 12, wherein the BFD reference signal measurement window is based at least in part on a particular quantity of slots.

16. The UE of claim 15, wherein the particular quantity of slots is based at least in part on at least one of a numerology of a bandwidth part or a reference subcarrier spacing.

17. The UE of claim 12, wherein the BFD reference signal measurement window is statically defined.

18. The UE of claim 12, wherein the one or more processors are further configured to:
receive signaling identifying the BFD reference signal measurement window.

19. The UE of claim 18, wherein the signaling includes an explicit identifier of the BFD reference signal measurement window, or a transmission configuration indicator state identifier, for the second BFD reference signal, which corresponds to a size of the BFD reference signal measurement window.

20. The UE of claim 12, wherein the one or more processors are further configured to:
use the first BFD reference signal based at least in part on receiving a sample for the second BFD reference signal.

21. The UE of claim 12, wherein the BFD reference signal measurement window corresponds to a physical downlink control channel beam switching interval, and wherein the one or more processors, when using the second BFD reference signal, are configured to:
use the second BFD reference signal based at least in part on whether the physical downlink control channel beam switching interval is elapsed.

22. The UE of claim 21, wherein the physical downlink control channel beam switching interval is configured such that at least one BFD reference signal occasion associated with the second CORESET beam occurs during the physical downlink control channel beam switching interval.

23. A non-transitory computer-readable medium storing a set of instructions for wireless communication, the set of instructions comprising:
one or more instructions that, when executed by one or more processors of a user equipment (UE), cause the UE to:
receive a beam update message identifying a change from a first control resource set (CORESET) beam to a second CORESET beam;
monitor for a first beam failure detection (BFD) reference signal associated with the second CORESET beam; and
use, for a BFD procedure and based at least in part on the first BFD reference signal not being received within a BFD reference signal measurement window, a second BFD reference signal associated with the first CORESET beam.

24. The non-transitory computer-readable medium of claim 23, wherein the one or more instructions, that cause the UE to use the second BFD reference signal, cause the UE to:

use the second BFD reference signal based at least in part on an expiration of a time period corresponding to the BFD reference signal measurement window.

25. The non-transitory computer-readable medium of claim 23, wherein the BFD reference signal measurement window is defined from a receipt of the beam update message to a threshold end time.

26. The non-transitory computer-readable medium of claim 23, wherein the BFD reference signal measurement window is based at least in part on a particular quantity of slots.

27. The non-transitory computer-readable medium of claim 26, wherein the particular quantity of slots is based at least in part on at least one of a numerology of a bandwidth part or a reference subcarrier spacing.

28. An apparatus for wireless communication, comprising:
   means for receiving a beam update message identifying a change from a first control resource set (CORESET) beam to a second CORESET beam;
   means for monitoring for a first beam failure detection (BFD) reference signal associated with the second CORESET beam; and
   means for using, for a BFD procedure and based at least in part on the first BFD reference signal not being received during a BFD reference signal measurement window, a second BFD reference signal associated with the first CORESET beam.

29. The apparatus of claim 28, wherein the means for using the first BFD reference signal or the second BFD reference signal comprises:
   means for using the second BFD reference signal based at least in part on an expiration of the BFD reference signal measurement window.

30. The apparatus of claim 28, wherein the BFD reference signal measurement window is defined from a receipt of the beam update message to a threshold end time.

* * * * *